Figure 1:
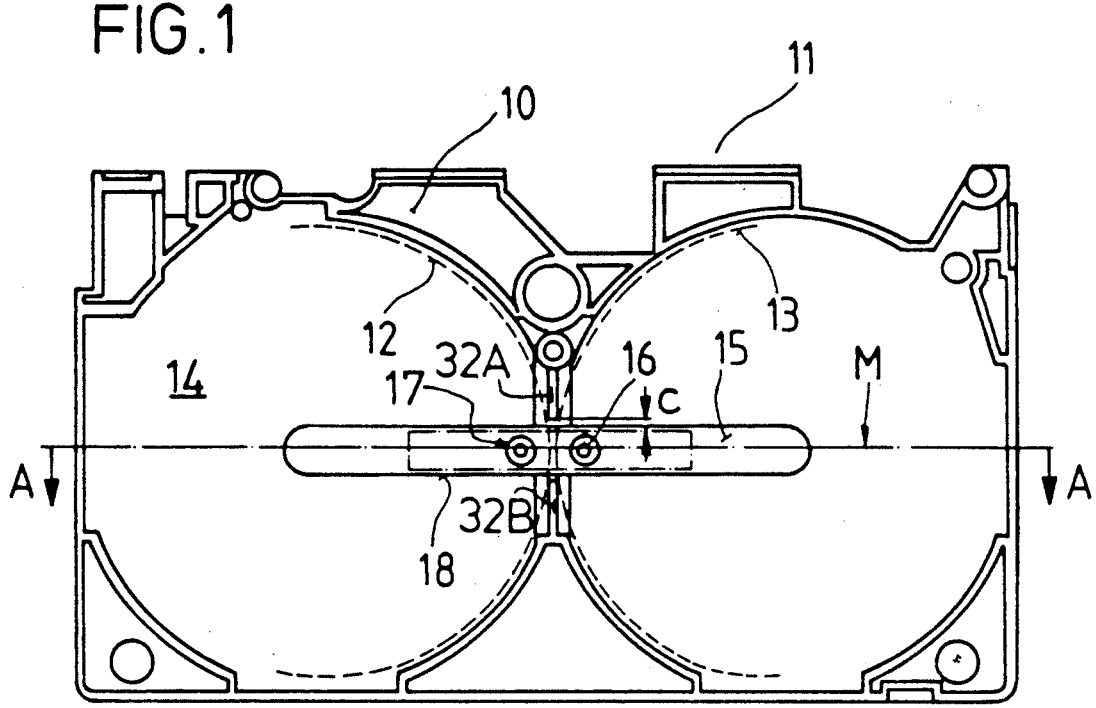

United States Patent [19]

Schoettle et al.

[11] Patent Number: 5,042,740
[45] Date of Patent: Aug. 27, 1991

[54] PRESSURE SPRING FOR TAPE CASSETTES AND TAPE CASSETTES HAVING SAID SPRING

[75] Inventors: Klaus Schoettle, Heidelberg; Juergen Dreyer, Willstaett; Siegfried Riegger, Ettenheim; Willi Schuhmacher, Kippenheim, all of Fed. Rep. of Germany

[73] Assignee: BASF Aktiengesellschaft, Ludwigshafen, Fed. Rep. of Germany

[21] Appl. No.: 494,456

[22] Filed: Mar. 16, 1990

[51] Int. Cl.$^5$ .................. G11B 15/32; F16F 1/18
[52] U.S. Cl. ............................. 242/199; 360/132; 267/158
[58] Field of Search ............. 242/199, 198; 360/132; 267/159, 158, 160, 52; 206/387, 389

[56] References Cited

U.S. PATENT DOCUMENTS

| 4,428,547 | 1/1984 | Gotoh | 242/199 |
| 4,672,498 | 6/1987 | Harada | 360/132 |
| 4,717,091 | 1/1988 | Schoettle et al. | 242/199 |
| 4,770,367 | 9/1988 | Carroll . | |
| 4,781,340 | 11/1988 | Shiba et al. | 242/199 |
| 4,802,044 | 1/1989 | Iwahashi et al. | 242/199 X |

FOREIGN PATENT DOCUMENTS 0272556 6/1988 European Pat. Off. .
8807993.7 9/1988 Fed. Rep. of Germany .

Primary Examiner—Daniel P. Stodola
Assistant Examiner—John P. Darling
Attorney, Agent, or Firm—Keil & Weinkauf

[57] ABSTRACT

A pressure spring for tape cassettes which consists of a spring steel strip which is, in particular, narrow and is of roughly uniform width comprises a flat central part and curved spring arms adjacent to said part and having a continuous curve. The flat central part has, as fastening parts, holes with indented fastening collars which, together with rivet pegs and recesses in a housing wall, form a roughly projection-free spring fastening, the riveted peg ending roughly at the spring surface. The pressure spring exhibits a straight line with a defined slope in the operating region of its spring characteristic. The pressure spring can be used for tape cassettes of all types, in particular for video cassettes.

19 Claims, 5 Drawing Sheets

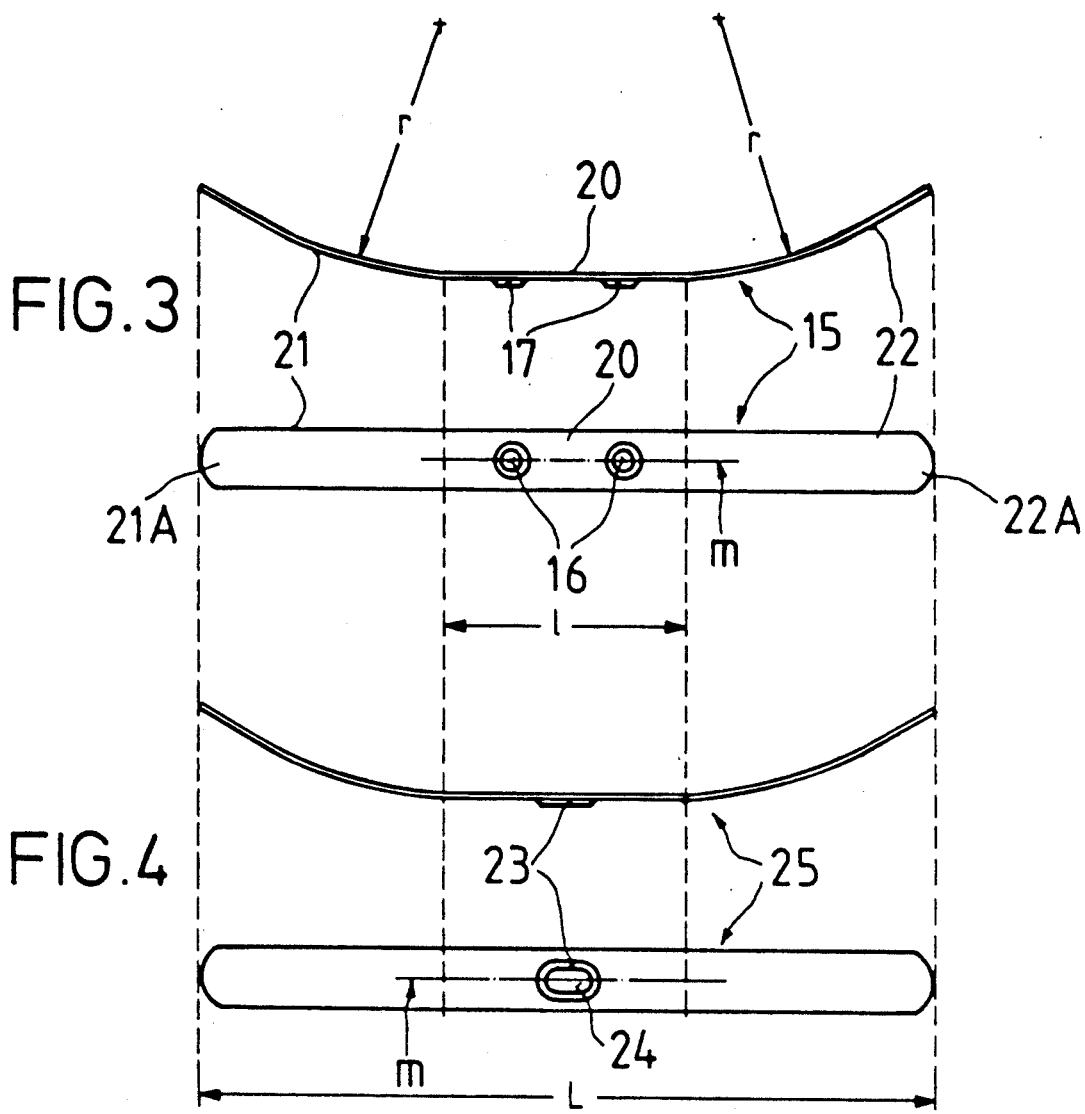

PRESSURE SPRING FOR TAPE CASSETTES AND TAPE CASSETTES HAVING SAID SPRING

The present invention relates to a pressure spring for tape cassettes, in particular for video magnetic tape cassettes, fastened to the cassette housing and consisting of a curved spring steel strip of uniform width, for spring loading one or more tape reels in the direction of their operating position, the central region of the pressure spring being provided with fastening means which are arranged at a distance from the plane of the central region of the spring, and tape cassettes having pressure springs.

German Utility Model 83 35 294 discloses a pressure spring of this type which is provided with embodiments which, as fastening means, possess a U-bend, semi-pyramidal stamped beads at the spring edge or cut-out and bent-up inner lobes While the U-bend was intended for insertion into window incisions, the stamped beads and inner lobes were meant to be mounted on the cassette housing by welding A unique alignment of the pressure spring and its fastening in large scale production are thus not possible.

U.S. Pat. No. 4,770,367 discloses a narrow pressure spring which has two fastening holes in the central region and possesses two transverse bends on each spring arm. The fastening holes are punched holes and, for each spring fastening by welding or thermal riveting, it is necessary for material to emerge beyond the surface of the central region of the spring, which, owing to the small amount of space inside the cassette, may lead to interference with the reel flange and to serious functional problems during operation of the cassette Curvature of the spring itself may likewise restrict the latitude of the reels. The bends give the spring a nonlinear spring characteristic, which is disadvantageous for the functioning of the cassette.

European Laid-Open Application 272,556 furthermore describes similar spring embodiments having transverse bends, and single-hole fastening may lead to rotation of the spring and, because of the above-mentioned emergence of material, interference with the reel flange may be unavoidable. The bend adjacent to each spring end is intended to shorten the effective spring arm, essentially in order to reduce the reactive spring forces occurring at the single-hole fastening and to reduce the width and thickness of the spring material and the height of an offset of the spring. This likewise results in a nonlinear spring characteristic.

German Utility Model 88 07 993 discloses a further pressure spring which may be provided with transverse bends and has, in the central region, guide elements molded on the cassette housing and coordinated with the longitudinal edges of the spring, and which can be fastened by means of a single fastening hole and a rivet molded on the housing wall by thermal welding. The disadvantages stated above for European Laid-Open Application 272,556 are also applicable here. Furthermore, transverse supporting webs formed on both sides in the immediate proximity of the rivet fastening on the cassette wall and intended for supporting and maintaining a rounded central section of the spring may also be provided. The production of the spring elements and supporting webs on the housing, which have to be relatively exactly arranged and formed, is very expensive.

It is an object of the present invention to provide a narrow, curved pressure spring which is not bent and a tape cassette having said spring and to provide said spring with fastening means for the tape cassette, so that it is possible to align the spring and trouble-free reel movement is ensured.

We have found that this object is achieved, according to the invention, by a pressure spring for tape cassettes, in particular for video magnetic tape cassettes, fastened to the cassette housing and consisting of a curved spring steel strip of uniform width, for spring loading one or more tape reels in the direction of their operating position, the central region of the pressure spring being provided with fastening means which are arranged at a distance from the plane of the central region of the spring, comprising a) a flat central region of the spring,
b) two curved spring arms adjacent to said region, each having a continuous bending curve, and
c) at least one hole and a fastening collar surrounding this hole, as fastening means.

This ensures a linear spring characteristic in conjunction with simple production, simple fastening and trouble-free pressure application and reel function In a further embodiment, the radius of the bending curve of the spring arms corresponds roughly to the length of the flat central region. This results in an easily producible basic spring shape in the unloaded state.

In a practical embodiment, an oblong hole having an indented, correspondingly shaped fastening collar may be provided in the middle of the central region of the spring.

This ensures spring fastening with a minimum of danger of rotation, owing to an elongated fastening base, as in the following embodiment having two circular holes along the central longitudinal axis of the flat central region of the spring.

In a particularly advantageous embodiment, the distance from the one or more fastening collars to the lower side of the flat central region of the spring should be from about 1 to 3, in particular about 1.6, times the thickness of the spring steel strip.

This ensures sufficiently reliable alignment and stable fastening In another embodiment, it is advantageous if the spring characteristic, at least in the region of the practical spring arm deflections, is essentially a straight line which has a slope of about 6% in particular in the region of the spring arm deflections of from 2 to 7 mm. This ensures an optimum spring characteristic with minimal use of material and minimum assembly costs.

In a novel tape cassette, in particular a video magnetic tape cassette, having a housing, in the center of one large wall of which a pressure spring is fastened in the center, and having one or more magnetic tape reels which is or are spring loaded by the pressure spring in the direction of its or their operating position, the pressure spring consisting of a curved spring steel strip of uniform width and the central region of the spring being provided with fastening means arranged at a distance from the plane of the central region of the spring, the required object is achieved by a) a flat central region of the spring,
b) two curved spring arms adjacent to said region and having a continuous bending curve,
c) at least one hole and an indented fastening collar surrounding said hole, as fastening means, and
d) at least one holding recess corresponding to the fastening collar of the pressure spring, in or on the large housing wall.

In another practical embodiment of the cassettes, the holding recess may be an annular groove which surrounds a rivet peg which fits through the hole in the pressure spring.

With regard to dimensions, it should be ensured that the rivet peg has a volume such that, after insertion of the fastening edge in the annular groove and after riveting, the plastic material of the rivet peg projects only to an insignificant extent, if at all, beyond the surface of the flat central region of the pressure spring. In every case, even with tumbling reel movements which, owing to the summation of tolerances in the cassette, cannot be ruled out, this measure prevents contact with the reels and hence occurrence of serious reel and tape running problems during cassette operation.

In another embodiment of the tape cassette, ribs or webs or protrusions may be provided in the central longitudinal direction on the large housing wall, the pressure spring being fastened to the large housing wall and covering the said ribs, webs or protrusions.

This permits the large housing wall to be made thinner in part or in its entirety to save material, while retaining the bearing and space conditions for the pressure spring.

The total length of the ribs, webs or protrusions can be chosen so that they are about three fourths of the length of the extended pressure spring. However, it is also possible for the total length of the ribs, webs or protrusions to be about four fifths of the projected length of the curved pressure springs in the unloaded state. This ensures a defined spring deflection.

In a further embodiment of the tape cassette, the height of the ribs, webs or protrusions on the large housing wall may correspond roughly to the distance from the fastening collar to the lower side of the flat central region of the spring so that the ribs webs or protrusions may be formed together with the holding recess.

Advantageously, the tape cassette may possess, on the large housing wall, reinforcing webs in a transverse region with respect to the pressure spring, and at a distance away from the latter. This enables the wall to be reinforced to absorb the spring forces of the pressure spring and, independently of the resilience of the plastic material used and of the thickness of the wall, the deflection of the outside of the housing can be limited.

In a tape cassette, in particular a video magnetic tape cassette, having a housing, in the center of one of whose large walls a pressure spring is fastened, and having one or more magnetic tape reels which is or are spring loaded by the pressure spring in the direction of its or their operating position, the pressure spring consisting of a spring steel strip of small width and the flat central region of the spring being provided with fastening means, it may in general be advantageous, from the point of view of saving material and/or the use of economical material, to provide reinforcing webs on the large housing wall, essentially transverse with respect to the pressure spring at a distance away from the said spring. For video cassettes, these reinforcing webs may have a thickness of, in particular, about 1-2 mm.

Figure 2:
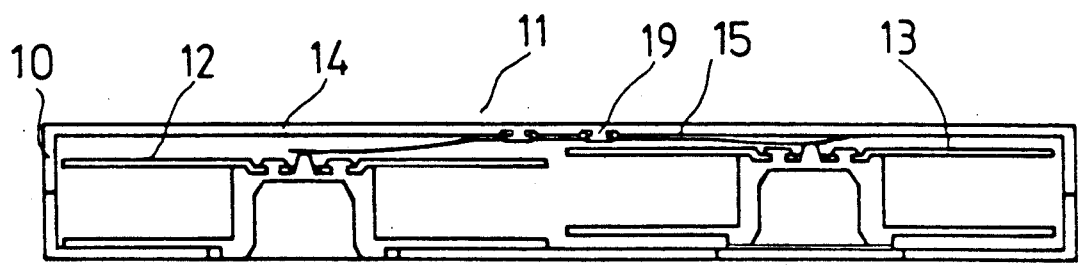
Figure 7:
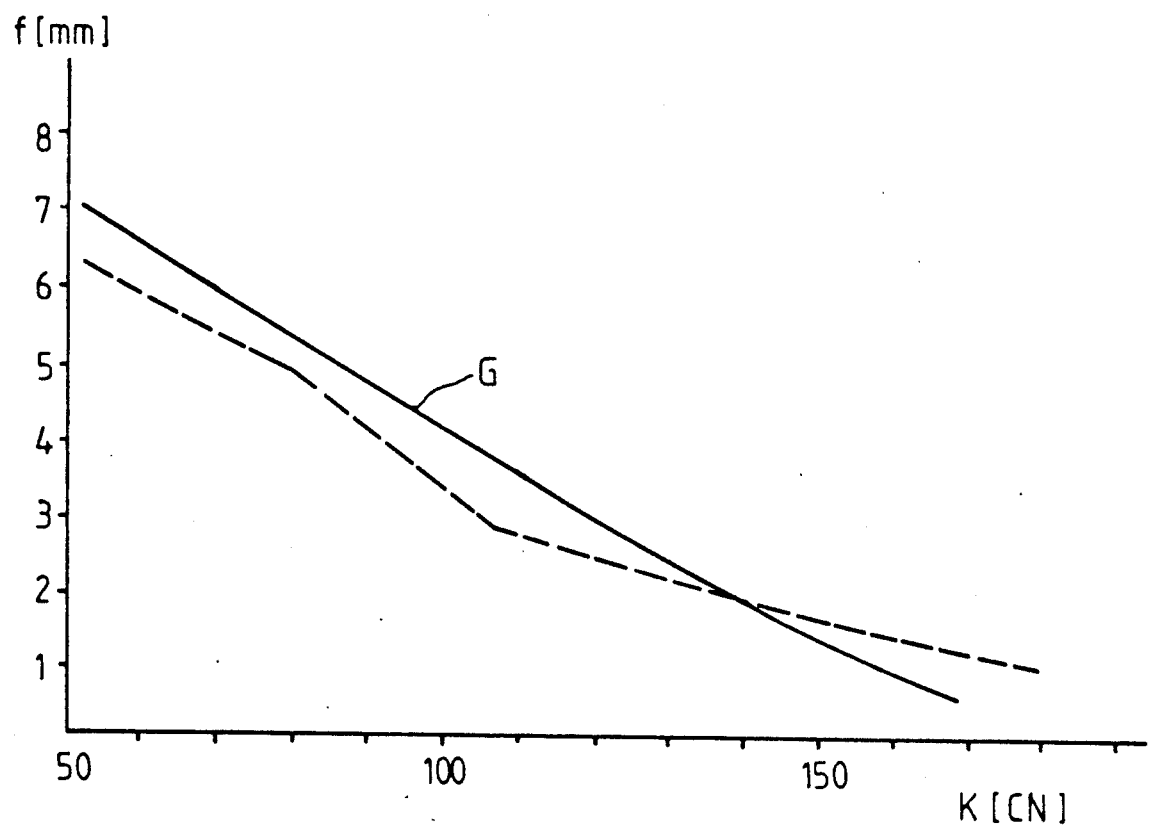
Figure 8:
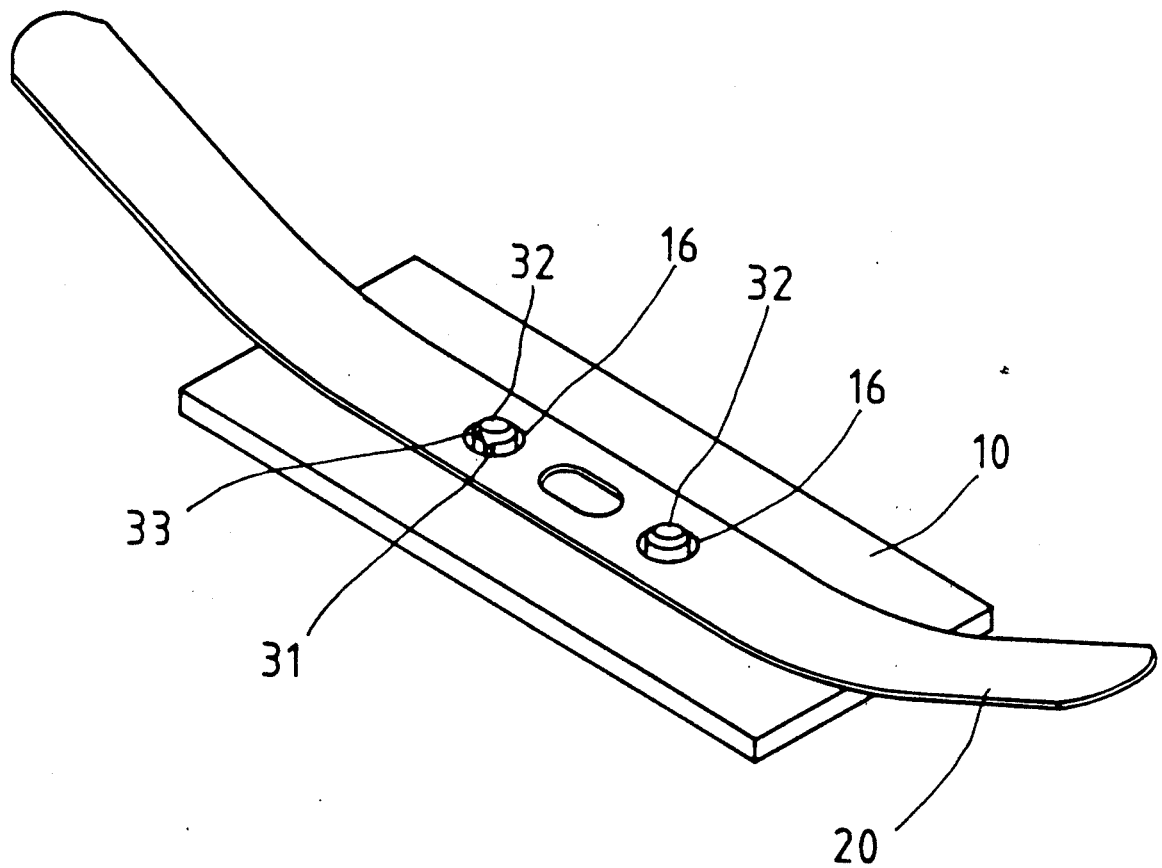
Figure 8B:
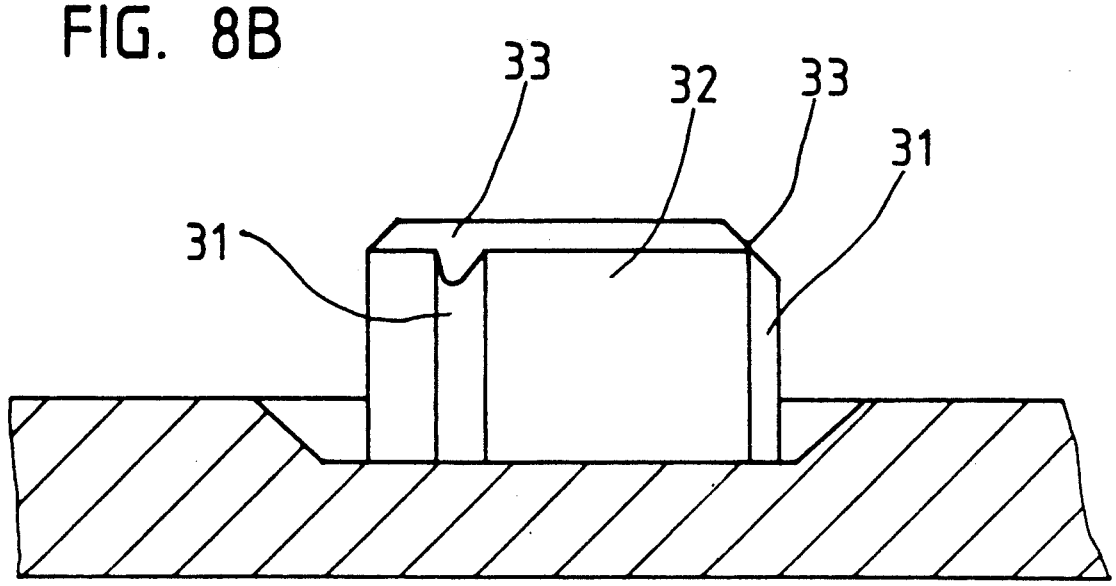
Figure 8A:
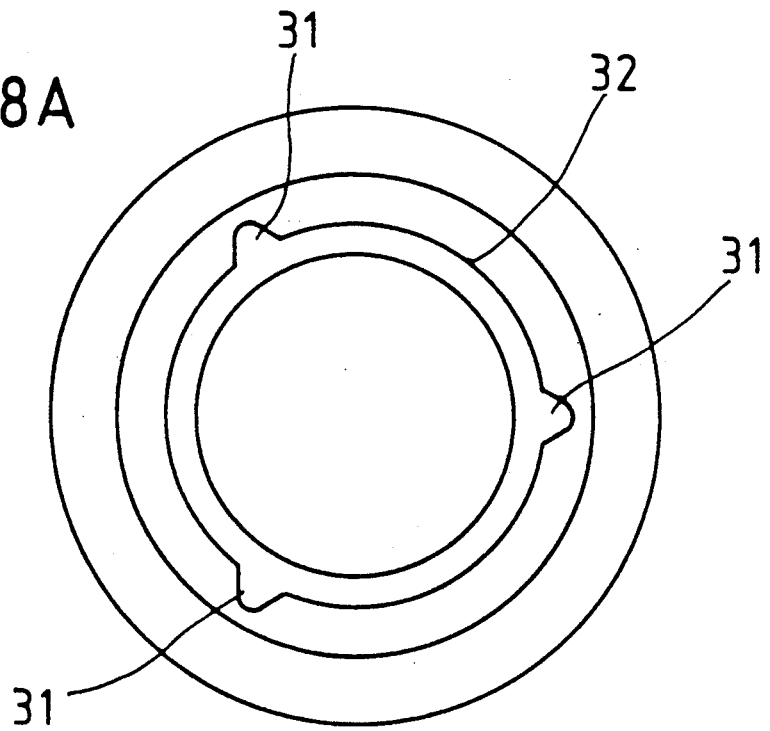

Embodiments of the invention are described below and illustrated in the drawings, where FIG. 1 shows a schematic video cassette having a novel pressure spring, FIG. 2 shows a longitudinal section through a video cassette having a pressure spring according to FIG. 1, FIG. 3 shows the pressure spring according to FIG. 2, in side view and plan view, FIG. 4 shows a further pressure spring, in side view and plan view, FIG. 5 and FIG. 6 each show a cross-section through a pressure spring and its fastening elements on the large cassette wall, FIG. 7 shows the spring characteristic of the novel pressure spring compared with that of a known pressure spring having spring arms which each possess two bends, FIG. 8 shows an advantageously fastened spring on a wall part, and FIGS. 8A and 8B show pegs for the embodiment of FIG. 8.

FIG. 1 shows an upper part 10 of the housing 11 of a video cassette having flanged reels 12 and 13 which are indicated by dashed lines and are arranged very close to one another (about 2 mm in an actual VHS cassette) in the center of the large housing wall 14. A narrow, two-armed pressure spring 15 is provided with two circular holes 16 and collars 17 surrounding said holes, for fastening to the wall 14. The spring 15 extends centrally, along the central longitudinal axis M of the housing 11. Reinforcing webs 32 A and 32 B may be provided along the transverse central axis of the housing 11, as described below.

A support means in the form of a web 18, indicated by a dash-dot line, is provided under the spring 15, and said web may consist of a plurality of parts or of ribs or protrusions.

FIG. 2 shows a longitudinal section A—A of the central longitudinal axis M, but with a complete housing 11, with the actual two reels 12 and 13, without the web 18 but with the spring 15, which subjects the reels 12 and 13 centrally to a load by means of the ends of the spring arms.

While reel 12 is shown in its lowermost position, reel 13 is shown in the uppermost position. The spring 15 is fastened to the wall 14 of the upper part 10 by means of weld rivets 19, and it can be seen that little or no weld material projects beyond the upper surface of the spring 15, or more precisely of the flat central region of the spring or flat central part 20 of the spring. It is also clear that the upper flange of the reels 12 and 13 come very close to the weld rivets 19 of the spring 15, and the rotation of the reels 12 and 13 may be hindered, possibly by tilting in housing 11, if the rivets 19 project beyond the surface of the spring 15.

The shape of the spring 15 is shown in FIG. 3. Spring 15, as well as spring 25, consists of the flat central part 20 of the spring, the curved spring arms 21 and 22 and the ends 21 A and 22 A of the spring arms, in the proximity of which ends are the pressure points for the reel centers. The circular holes 16 are arranged along the central axis m of the spring 15 in order to avoid unnecessarily weakening the material in this region. The circular holes 16 are surrounded by the indented annular collars 17 which, like the oblong or oval collar 23 of the spring 25 in FIG. 4, serve for fastening the spring. The oblong or oval collar 23 surrounds the slot 24 of the spring 25. The longitudinal extension of the slot 24 may be made even larger in order to increase the longitudinal base of the fastening, which provides security against unintentional rotation of the spring.

As can be seen, the flat central part 20 of the spring is flat over the length 1, which, as in the case of the other dimensions stated, also applies to the spring 25. Advantageously, the bending curve radius r of the spring arms 21 and 22 is chosen to be about as large as the length 1 of the flat central part 20. Curving is effected in practice in such a way that the spring tension of the spring steel strip is retained.

The collars 17 and 23 may, for example, have the shape shown in FIGS. 5 and 6. Through the circular hole 16 or slot 23 passes a rivet peg 26 or 27 which, as indicated by a dash-dot line in both cases, should have a volume such that almost the depression 28 or 29 still remaining free on insertion of collars 17, 23 is just filled with material.

Collar 17 A or 23 A in FIG. 5 is slightly trough-shaped. However, other suitable cross-sectional shapes may also be used for these collars. The holding recesses 30 and 34 have a shape corresponding to the associated collar shapes and they can each be molded on to the large housing wall 14 during production of the latter.

The distance a from the collar 17 (23), 17 A (23 A) to the lower side of the central part 20 of the spring is about 2.5 times as great as the spring steel thickness d in both cases (FIGS. 5 and 6). In practice, a value of a ~ 1.6 d has proven suitable, and a should be from about 1 to 3 times the thickness d.

FIG. 7 shows a spring characteristic. The distance f from the end of the spring arm to the cassette bottom is plotted in millimeters (mm) along the ordinate and the measured spring force K is plotted in centi-Newton (cN) along the abscissa.

The dashed characteristic indicates a spring having two transverse bends on each spring arm, according to U.S. Pat. No. 4,770,367. The characteristic has clearly nonlinear regions which, from the technical point of view, are clearly formed when the bends each touch, or come to rest on, the inner wall of the cassette In contrast, the solid spring characteristic of a novel spring 15 or 25 is distinguished by a straight line G, at least in the region from 2 to 7 mm, and has a slope of about 6%, with the result that a linearly increasing spring force is achieved.

By means of such linear spring forces, any abnormal reel movements, for example tumbling rotations, can be counteracted.

The total length of the support means 18, which could also be in the form of ribs or protrusions in lieu of the rib shown in FIG. 1, can be about 4/5 of the projected length 1 of the springs 15 and 23; they may also be ¾ of this length, based on the extended length of the springs 15 and 25. In any case, there is also a possibility of varying the adjustment of the effective spring forces when such webs, ribs or protrusions are used.

In FIG. 1, reinforcing webs 32 A and 32 B are provided in the center of the large housing wall 14, which webs may have a height at least corresponding to the spring thickness or greater and a width of about 1–2 mm and may be a distance of about 0.2–0.5 mm from the longitudinal sides of the spring, since it is not essential to effect guidance and positioning. These webs 32 A and 32 B, which are in fact divided webs, may also be provided in a plurality and at an angle to the spring but should be roughly symmetrical therewith and with the transverse central axis. By means of such reinforcing webs, the wall deflection can be kept within limits with a minimum wall thickness.

Before the novel spring is fastened by welding or riveting, it is necessary, during mass production, first to introduce the spring into the upper part 10 of the housing and to hold it in a defined position so that fastening can be effected in the correct location and position. However, since the volume of the weld or rivet peg 26 or 27 should be kept as small as possible, owing to the space available inside the cassette, the length of the pegs 26 and 27 is also very small. However, this increases the danger that the spring will tilt and will be fastened in a tilted position.

In FIGS. 8 and 8A,8B an embodiment for the peg, denoted 32, is illustrated which is more elaborate than that of cylindrical peg 26, FIG. 5, or 27, FIG. 6, and which eliminates the foregoing difficulty in that it is provided with a number of auxiliary ribs 31 arranged on the outer circumference. Preferably, and as shown in detail in FIGS. 8A,8B, the auxiliary ribs 31 may be arranged about the circumference of peg 32, mutually spaced at angular intervals of about 120°.

The peg 32 has a beveled leading edge 33 which extends as far as that of the auxiliary rib(s) 31.

When the peg 32 and the circular holes 16 of the spring 20 are resigned with an appropriate diameter, the spring 20 is jammed on the peg 32 when the circular orifices 16 are placed over the pegs 32, 26, 10, and the spring 20 is pressed against the support surface of the upper part 10.

The spring 20 is thus already adequately held by a single peg 32 having the auxiliary rib or ribs 31, even for further transport operations, for example to the welding or riveting station, so that production is made substantially more reliable.

Of course, it is also possible for both pegs 32 and 32, to be provided with at least one or three auxiliary ribs 31. The shape of the auxiliary rib 31 in FIG. 8A has been chosen to be triangular with rounded edges. The auxiliary rib 31 can, however, also have another suitable shape.

We claim:

1. A pressure spring for tape cassettes having a housing, said pressure spring being fastened to the cassette housing and consisting of a curved spring steel strip of uniform width, for spring loading at least one tape reel in the direction of its operating position, the central region of the pressure spring having a base and being provided with fastening means arranged at a distance from said base of the central region of the spring for fastening the spring to the housing, wherein
   a) the central region of the spring is flat,
   b) said spring comprises two curved spring arms adjacent to said region and having a continuous bending curve, and
   c) said central region having at least one hole and an indented fastening collar surrounding said hole, as fastening means.

2. A pressure spring as claimed in claim 1, wherein the radius of the bending curve of the spring arms corresponds approximately to the length of the flat central region of the spring.

3. A pressure spring as claimed in claim 1, wherein said hole is oblong, is provided in the middle of the central region of the spring and is surrounded by an indented, correspondingly shaped fastening collar.

4. A pressure spring as claimed in claim 1, wherein said flat central region has two holes, said holes being circular, being provided along the central longitudinal axis of the central region of the spring and each said hole being surrounded by an indented annular fastening collar.

5. A pressure spring as claimed in claim 1, wherein the distance from the at least one fastening collar to the lower side of the central region of the spring is in the range of from one to three times the thickness of the spring steel strip.

6. A pressure spring as claimed in claim 5, wherein the distance of the at least one fastening collar is 1.6 times the thickness of the spring steel strip.

7. A pressure spring as claimed in claim 1, wherein the spring characteristic of the pressure spring is essentially a straight line, at least in the region of the spring arm deflections encountered in practice.

8. A pressure spring as claimed in claim 7, wherein the spring characteristic in the region of the spring arm deflections of from 2 to 7 mm has a slope of about 6%.

9. A tape cassette having a housing, a pressure spring fastened in the center of one large wall of said housing, and having at least one magnetic tape reel which is spring loaded by the pressure spring in the direction of its operating position, the pressure spring consisting of a curved spring steel strip of uniform width and the central region of the spring having a base and being provided with fastening means at a distance from said base for fastening said spring to said housing, wherein
  a) the central region of the spring is flat,
  b) said spring comprises two curved spring arms adjacent to said region and having a continuous bending curve,
  c) said central region having at least one hole and an indented fastening collar surrounding said hole, as fastening means, and
  d) said large housing wall has at least one holding recess corresponding to the fastening collar.

10. A cassette as claimed in claim 9, wherein the holding recess is an annular groove which is provided around a rivet peg which fits through the hole in the pressure spring and is fixed on said large wall of the housing.

11. A cassette as claimed in claim 10, wherein said rivet peg is provided on said large wall of the housing, the volume of the said peg being such that, after insertion of the fastening collar in the annular groove and after riveting, the plastic material of the rivet peg does not project beyond the surface of the central region of the pressure spring.

12. A tape cassette as claimed in claim 10, wherein said rivet peg has at least one auxiliary rib.

13. A tape cassette as claimed in claim 10, wherein said rivet peg has three auxiliary ribs arranged at intervals of about 120° C.

14. A cassette as claimed in claim 9, wherein support means for the flat central region of the spring are provided in the central longitudinal direction on said large housing wall, and the pressure spring is fastened to said large housing wall and covers said support means.

15. A cassette as claim in claim 14, wherein the total length of the support means is three fourths of the length of the extended pressure spring.

16. A cassette as claimed in claim 14, wherein the total length of the support means is four fifths of the projected length of the curved pressure spring in the unloaded state.

17. A cassette as claimed in claim 14, wherein the height of the support means on said large housing wall corresponds to the distance from the fastening collar to said base of the flat central region of the spring.

18. A cassette as claimed in claim 9, wherein reinforcing webs which are arranged at a distance from the pressure spring are provided on said large housing wall in a transverse region with respect to the pressure spring.

19. A cassette as claimed in claim 18, wherein the reinforcing webs have a thickness of from 1 to 2 mm.

* * * * *